US008293048B2

(12) United States Patent
Fei et al.

(10) Patent No.: US 8,293,048 B2
(45) Date of Patent: Oct. 23, 2012

(54) METHODS FOR SYNTHESIZING BULK, COMPOSITE AND HYBRID STRUCTURES FROM POLYMERIC CERAMIC PRECURSORS AS WELL AS OTHER POLYMERIC SUBSTANCES AND COMPOUNDS

(76) Inventors: Weifeng Fei, Oldsmar, FL (US); Arnold Hill, Orlando, FL (US); Mark Tellam, Orlando, FL (US)

( * ) Notice: Subject to any disclaimer, the term of this patent is extended or adjusted under 35 U.S.C. 154(b) by 97 days.

(21) Appl. No.: 12/584,213

(22) Filed: Sep. 1, 2009

(65) Prior Publication Data
US 2010/0116412 A1 May 13, 2010

Related U.S. Application Data

(60) Provisional application No. 61/190,755, filed on Sep. 2, 2008.

(51) Int. Cl.
| | |
|---|---|
| *C03B 29/00* | (2006.01) |
| *B29C 65/00* | (2006.01) |
| *B27N 3/00* | (2006.01) |
| *C04B 33/34* | (2006.01) |
| *B32B 7/00* | (2006.01) |
| *C09J 5/02* | (2006.01) |

(52) U.S. Cl. ... 156/89.11; 156/60; 156/62.8; 156/89.22; 156/307.1; 156/310

(58) Field of Classification Search ............... 156/89.11, 156/89.22
See application file for complete search history.

(56) References Cited

U.S. PATENT DOCUMENTS

| | | | |
|---|---|---|---|
| 4,100,233 A | | 7/1978 | Yajima et al. |
| 4,436,538 A | * | 3/1984 | Tomita et al. .......... 55/482 |
| 4,540,535 A | * | 9/1985 | Tomita et al. .......... 264/628 |
| 4,604,367 A | | 8/1986 | Takamizawa et al. |
| 4,810,685 A | * | 3/1989 | Twigg et al. .......... 502/60 |
| 4,837,230 A | | 6/1989 | Chen et al. |
| 5,032,551 A | | 7/1991 | Tashiro |
| 5,063,007 A | * | 11/1991 | Gabathuler et al. ....... 156/89.11 |
| 5,171,722 A | | 12/1992 | Toreki et al. |
| 5,223,461 A | | 6/1993 | Riccitiello |

(Continued)

OTHER PUBLICATIONS

Greil, Peter, "Polymer Derived Engineering Ceramics," Advanced Engineering Materials, 2000, 2, No. 6, pp. 339-348.* Studart et al., "Processing Routes to Macroporous Ceramics: A Review," Journal of American Ceramics Society, 89 [6], 1771-1789 (2006).*
Jiang, Hill, Fei, Wei, Tellam,Xu, and An. "Making Bulk Ceramic from Polymeric Precursors"; J.Am.Ceram.Soc. 93 [10] 3017-3019 (2010). The American Ceramic Society.
Colombo, Mera, Riedel, Soraru "Polymer-Derived Ceramics:40 Years of Research and Innovation in Adv Crmc"; J.Am.Ceram.Soc. 93 [7] 1805-1837 (2010). The American Ceramic Society.
Hi-Nicalon Ceramic Fiber Specification. COI Ceramics, Inc. ATK Space Systems. www.c o i ceramics. c o m, Jan. 2006.
Hi-Nicalon Type S Ceramic Fiber Specification. COI Ceramics, Inc. ATK Space Systems. www. c o i ceramics. c o m, Jan. 2006.

*Primary Examiner* — Philip Tucker
*Assistant Examiner* — Alex Efta
(74) *Attorney, Agent, or Firm* — The Patent Guild; Paul Royal (57) ABSTRACT

This invention relates to polymer derived ceramics (PDC's) and more particularly, to methods and product made by using polymeric derived ceramic precursors to synthesize dense, crack-free bulk ceramics in a technique using sacrificial molds, coating processes, replication processes, assembly processes and finishing processes; where gas release paths are created and maintained during these processes to release gases generated during pyrolysis of the ceramic precursor. It is a primary objective of the present invention to provide a well defined method to create PDC voxels which are interconnected as a bulk (high density) material. Such a material is effectively a lattice with face centered cubic or hexagonal close pack geometry. A second objective of the present invention is to provide a method for bulk, high density material to be combined with fully dense material in a hybrid material. A third objective of the present invention is to provide a method for different types of bulk and fully dense materials, and other items (optionally), to be combined in to a composite material.

22 Claims, 9 Drawing Sheets

U.S. PATENT DOCUMENTS

| | | |
|---|---|---|
| 5,358,674 A | 10/1994 | Rabe |
| 5,571,848 A * | 11/1996 | Mortensen et al. ............. 521/61 |
| 5,632,834 A | 5/1997 | Ostertag et al. |
| 5,707,471 A | 1/1998 | Petrak et al. |
| 5,902,756 A | 5/1999 | Aly et al. |
| 5,976,454 A | 11/1999 | Sterzel et al. |
| 6,103,178 A | 8/2000 | Bujalski |
| 6,383,422 B1 * | 5/2002 | Hoffschmidt ................... 264/44 |
| 6,521,246 B2 | 2/2003 | Sapieszko et al. |
| 6,723,279 B1 | 4/2004 | Withers et al. |
| 6,929,866 B1 | 8/2005 | Williams et al. |
| 2011/0033772 A1 * | 2/2011 | Tucker et al. ................. 429/479 |

* cited by examiner

METHODS FOR SYNTHESIZING BULK, COMPOSITE AND HYBRID STRUCTURES FROM POLYMERIC CERAMIC PRECURSORS AS WELL AS OTHER POLYMERIC SUBSTANCES AND COMPOUNDS

The present application claims the benefit of priority from U.S. Provisional Patent Application Ser. No. 61/190,755 filed on Sep. 2, 2008 and is incorporated herein by reference.

FIELD OF THE INVENTION

This invention relates to polymer derived ceramics (PDC's) and more particularly, to methods and product made by using polymeric derived ceramic precursors to synthesize dense, crack-free bulk ceramics in a technique using sacrificial molds, coating processes, replication processes, assembly processes and finishing processes; where gas release paths are created and maintained during these processes to release gases generated during pyrolysis of the ceramic precursor.

BACKGROUND AND PRIOR ART

Recently it has been demonstrated that covalent bonded ceramics, such as silicon carbides (SiC, SiOC), silicone nitrides, (Si3N4, SiCN), aluminum nitride (AlN) and hafnium carbide (HfC) can be synthesized by thermal decomposition of suitable polymeric precursors, and are referred to as polymer derived ceramics. Two of the inventors have previously made application for a patent on related work entitled 'Method For Synthesizing Bulk Ceramic And Structures From Polymeric Ceramic Precursors' (U.S. Patent Application 61/029,651). That patent application refers to a method for creating 'bulk ceramic' . . . which is a ceramic which has a high density.

When PDCs are polymerized from their liquid state, they shrink slightly, which can introduce stresses between them and objects incorporated in them, or onto which they are applied. When the polymerized PDCs are pyrolyzed, they undergo significant shrinkage and can deform, separate and fracture, if not defined and supported properly.

Other inventors, such as Chen et al, (U.S. Pat. No. 4,837, 230) have worked with ceramic matrix composites, where a ceramic matrix material is applied to ceramic reinforcement fabric. If a PDC matrix material is applied to a ceramic reinforcement fabric, it can deform, separate and fracture. The chief purpose of Chen's invention is to coat the reinforcement fabric and utilize the properties of the ceramic matrix material as an adhesive and bonding agent which provides some structure. The composite created is not high density. Flaws introduced into the composite are distributed throughout its volume. In order to create a more dense and defect free article, repetitions of coating, polymerizing and pyrolyzing are required. These sequential processes compound stresses and defects.

Other inventors, such as Petrak et al (U.S. Pat. No. 5,707, 471) have worked with fiber reinforced ceramic matrix composites where the fibers are coated and pyrolyzed under refractory conditions. The use of these pre-coated fibers to enhance bonding in a greater object is the subject of Petrak's work. Again, the composite created is not high density, and in order to create a more dense and defect free article, repetitions of coating, polymerizing and pyrolyzing are required.

Other inventors, such as Sapieszko et al (U.S. Pat. No. 6,521,246) create a matrix which they apply to a porous sponge. The sponge element is coated with the ceramic matrix, and the sponge itself is burned out leaving the ceramic matrix . . . which is further pyrolyzed into a ceramic object. Sapieszko acknowledges that the result can be a powder which is morphologically uniform and of small dimension. Sapieszko achieves highly and uniformly porous bodies with this approach when they don't crumble into a powder. In his approach, porosity of at least 75% is preferred.

Other inventors, such as Ostertag et al (U.S. Pat. No. 5,632, 834) utilize a ceramic matrix material to bond and adhere sandwich structures. PDCs can be incorporated into the ceramic matrix, which can also include fillers.

In general, the prior art includes means of developing low density bulk ceramic from PDCs. Other prior art refers to means of creating moderate density composite structures using repeated infiltration cycles and process steps, using more infiltration process steps to increase overall density where desired and when possible.

In summary, polymer derived ceramic precursor (PDC) is a fluid which can be made (polymerized) into a plastic which can be transformed (pyrolyzed) into a ceramic.

Scaffold has been used to provide a surface for coating with PDCs, or to provide randomized gas channels for their use by functioning as gross mechanical passageways.

PDC pre-ceramic and ceramic voxels, volumetric elements, are those volumes occupied by PDC during and after polymerization and pyrolysis.

A PDC green body is formed of a collection of PDC voxels substantially interconnected with one another. In some of the aforementioned art, the majority of the body is not ceramic matrix material, and the PDC is just a binder. A PDC green body formed by a scaffold which constrains the PDC into an interconnected network of voxels would have a high volume of PDC and the majority of the body would become ceramic matrix material.

The 'Critical Dimension' (maximum dimension of an irregular voxel) or 'Critical Diameter' (maximum dimension of a spherically regular voxel) is notable, as for each PDC there is a 'Critical Dimension' up to which a 'solid' voxel can be formed without catastrophically failing during pyrolysis.

A 'bulk' 'white, black or gray' precursor, scaffold and resultant polymer green body and bulk ceramic of one constituent, can be created using a scaffold, scaffold design or lattice design to render a high density pre-ceramic and ceramic material from one of the 'white, black or gray' constituents.

A 'hybrid' white, black or gray precursor, scaffold and resultant polymer green body and fully dense and bulk ceramic of one constituent, is formed from a combination of bulk (high density), as well as fully dense material in combination in a part.

A 'composite' 'white and/or black and/or gray' precursor, scaffold and resultant polymer green body and ceramic of two or more of the 'white, or black or gray' constituents . . . thus having multiple constituent bulk and fully dense ceramic, and non-ceramic components; having multiple densities (e.g. high density bulk; and fully dense=hybrid characteristics) as well as multiple constituent materials.

SUMMARY OF INVENTION

It is a primary objective of the present invention to provide a well defined method to create PDC voxels which are interconnected as a bulk (high density) material. Such a material is effectively a lattice with face centered cubic or hexagonal close pack geometry.

A second objective of the present invention is to provide a method for bulk, high density material to be combined with fully dense material in a hybrid material.

A third objective of the present invention is to provide a method for different types of bulk and fully dense materials, and other items (optionally), to be combined in to a composite material.

BRIEF DESCRIPTION OF FIGURES

FIGS. 1a, 1b and 1c. Hexagonal Close Pack or Face Centered Cubic Geometric Lattices FIG. 2a. Sacrificial Spherical Voxels in a Lattice Geometry FIG. 2b. Sacrificial Spherical Voxels in a Lattice Geometry with a Sacrificial Interstitial Material FIG. 2c. The Sacrificial Interstitial Material saturated with PDC FIG. 2d. The remaining PDC with the interstitial material removed FIG. 3. Hybrid Combination of Alternate PDCs and Scaffolds FIG. 4a. Hybrid Combination of Bulk Object, Coated with Several Fully Dense Surface Areas FIG. 4b. Hybrid Combination of Bulk Object and Connected Fully Dense Feature FIG. 4c. Hybrid Combination of Bulk Object with One Fully Dense Surface FIG. 5a. Hybrid Combination of Bulk Material Framing a Fully Dense Element FIG. 5b. Hybrid Combination of Bulk Element and Cantilevered Fully Dense Element FIG. 5c. Hybrid Combination of Bulk Element and Attached Fully Dense Pre-Ceramic Feature FIG. 5d. Hybrid Combination of Bulk Element and Attached Fully Dense Pre-Ceramic Feature FIG. 6a. Hybrid Construction of Bulk element Coated with Two Different Fully Dense Elements FIG. 6b. Hybrid Construction of Bulk element Coated with Two Different Fully Dense Areas FIG. 7a. Composite Hybrid Construction of Bulk element assembled to another Bulk element FIG. 7b. Composite Hybrid Construction of Bulk element assembled to another Bulk element where each bulk element has integrated fully dense element FIG. 8. Composite Hybrid Construction of Bulk element assembled to Two pass thru conductors FIG. 9. Photograph of green body blocks, shaped green bodies and pyrolyzed ceramic parts showing steps of transformation, for parts of significant size.

DESCRIPTION OF PREFERRED EMBODIMENTS

Polymer derived ceramic (PDC) precursors can be polymerized into solid shapes. Typically as these shapes are pyrolyzed into ceramic, they do not survive as a large solid element. The polymeric material (pre-ceramic) consists of molecules which dismiss some of their atoms during transformation from polymer into ceramic. This dismissal occurs as an off-gassing process. This off-gassing process can be violent to the extent that the ceramic solid formed, fractures.

For any particular PDC precursor, being transformed from a pre-ceramic polymer material (through pyrolysis occurring through a temperature range and through a pressure range), there will exist a critical gas diffusion length which cannot be exceeded without causing mechanical or structural failure. This is one reason that many PDCs are used to create pure ceramic powders with small dimensions.

So for any particular PDC precursor, there is a critical diameter or critical dimension of ceramic volume (voxel) which can be reliably and repeatably formed.

When a large number of these pre-ceramic polymer voxels are created and organized in a lattice like pattern, they can form a face centered cubic (FCC) or hexagonal close pack (HCP) structure which is highly dense and which exhibits homogeneous mechanical properties. The PDC can be formed as substantially spherical units which are organized into a lattice like structure with interstitial spaces. A lattice like structure can be created in these interstitial spaces into which fluid PDC is introduced and then polymerized After the PDC is polymerized, the scaffold into which it is introduced can be selectively removed leaving the interconnected PDC voxels.

The result is a homogeneous bulk solid ceramic having isotropic properties that can be formed from PDC. The theoretical density of FCC and HCP structures is on the order of 75%. Because the PDC voxels intersect where they touch, the bulk pre-ceramic and then ceramic solids thus formed have a density which typically exceeds 80%.

Figure 1A:
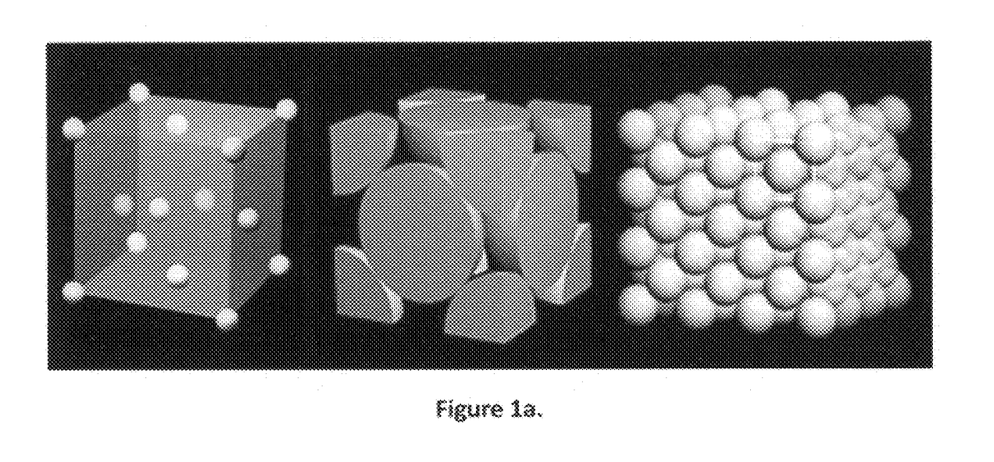
Figure 2A:
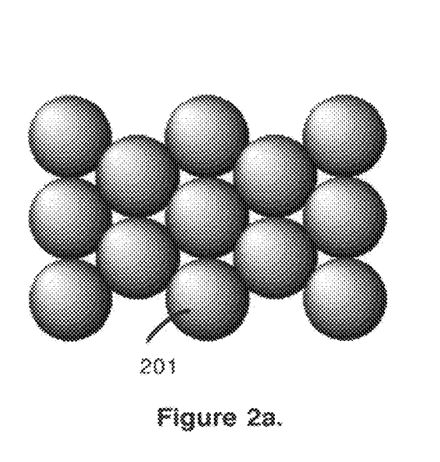
Figure 2B:
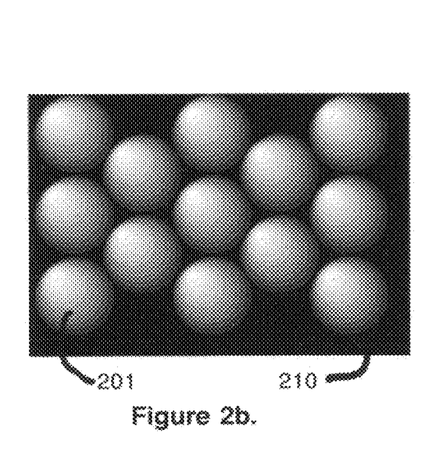
Figure 2C:
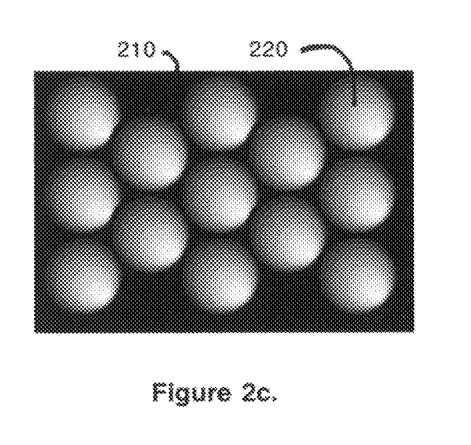
Figure 2D:
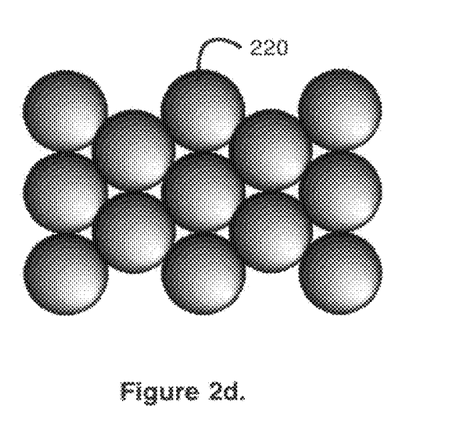

One means of creating the bulk ceramic is to assemble a large number of spheres of polymerized PDC. These spheres can have a uniform distribution of size, which does not exceed the critical diameter for them to remain intact upon pyrolysis (FIG. 1a). Another means of creating the bulk ceramic is to form a lattice of sacrificial spheres (FIG. 2a, 201) and then fill the interstitial network with a second sacrificial material (210). The sacrificial spheres are removed leaving the interstitial network (FIG. 2b, 210) The interstitial network is then filled with PDC (220), contained in a predictable and desirable geometry (FIG. 2c, 220). And after the PDC is polymerized, the second sacrificial material (FIG. 2c, 210) is selectively removed leaving the interstitial passages which provide means for gas to escape during pyrolysis (FIG. 2d).

Bulk Objects

Because the homogeneous bulk solids described herein have interstitial networks existing in them which preserve a critical voxel diameter (or maximum solid geometry allowing non-catastrophic gas diffusion during pyrolysis) they are not 'fully dense'. Bulk materials are very dense, but not fully dense. As has been discussed, very dense means greater than 75% density.

Bulk ceramic articles can be created from different PDCs with different critical dimensions of voxels, starting with solid voxels not exceeding a critical dimension, or being derived from a scaffold structure of predetermined geometry into which the PDC is introduced, rendering an interconnected network of channels of PDC material which can be polymerized and then pyrolyzed non-destructively.

Referring to (FIG. 3) a pre-ceramic white body with first polymer derived ceramic from a first spongy material and a first PDC precursor (301) is created in tandem with a pre-ceramic black body from a second polymer derived ceramic from a second spongy material and a second PDC precursor (330).

Figure 3:
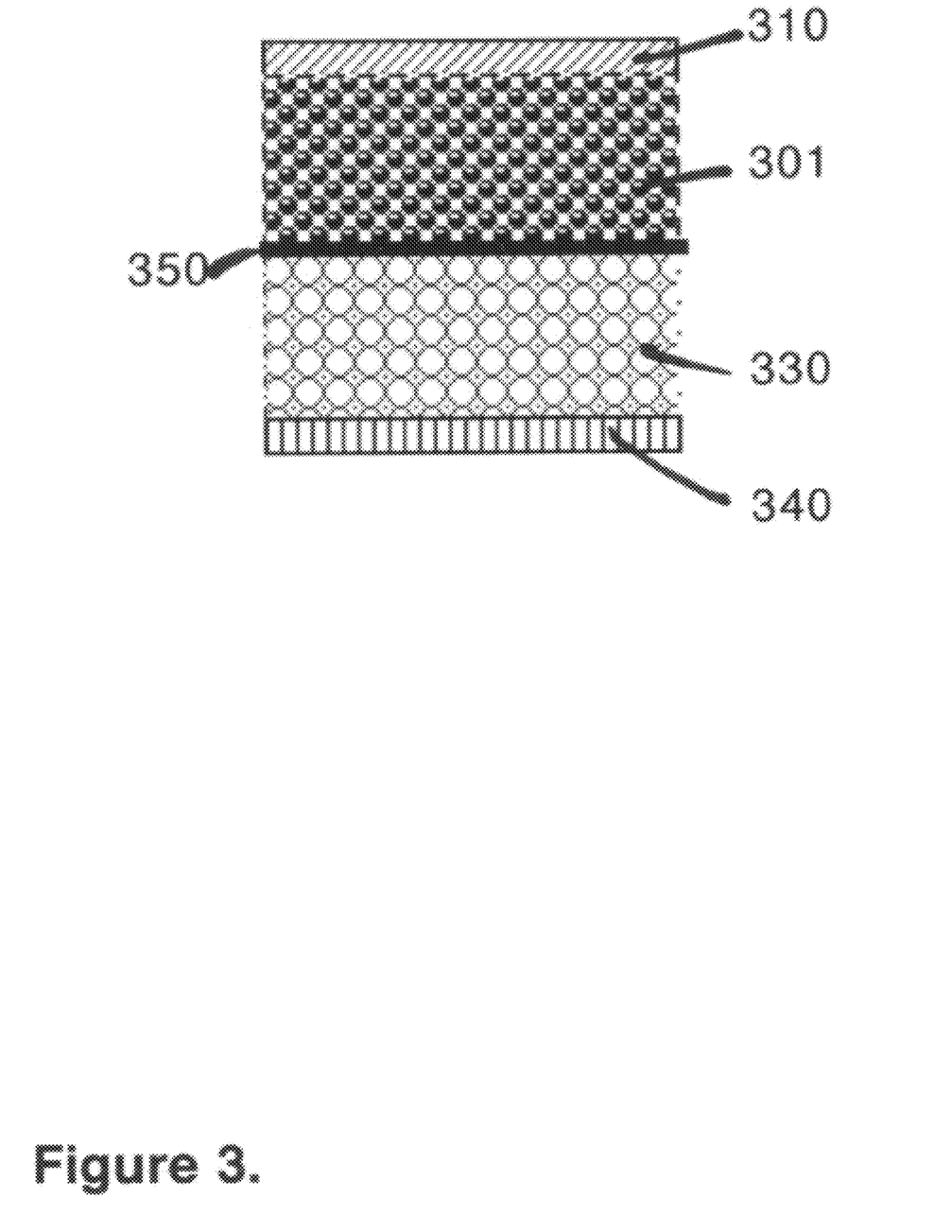

The pre-ceramic white body can share the same scaffold with the pre-ceramic black body. The pre-ceramic white body (301) shares an adjoining surface (350) with the pre-ceramic black body (330).

Where both the white body and black body have independent scaffolds, with independent critical variables for their respective PDCs, there is still an adjoining surface (350)

which satisfies the critical requirements of the more sensitive PDC constituent. The combination of the white body and black body is a 'hybrid'.

Figure 1B:
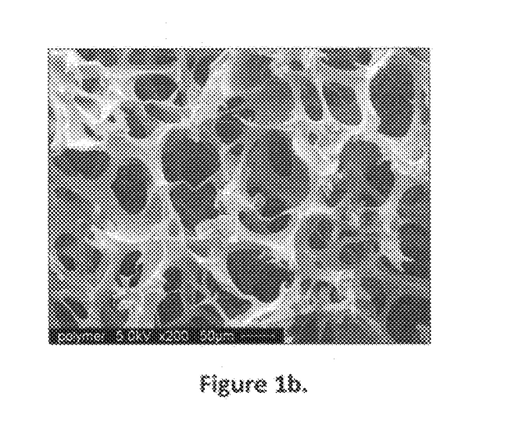
Figure 1C:
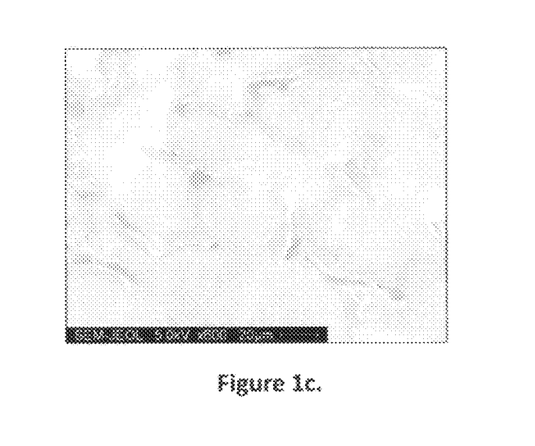

The spongy scaffold material is created and then utilized to form and support a network of solid polymerized PDC (pre-ceramic) (FIG. 1b). The spongy material is then removed, leaving the solid network which is interlaced with an interstitial network where the spongy material previously was (FIG. 1c).

The polymerized PDC material can be formed in to other shapes and assembled into a unitary assembly of polymerized PDC (pre-ceramic).

In its simplest form the bulk material is a pre-ceramic gray body which can be transformed into a polymer derived ceramic which started from a spongy material and a PDC precursor, where the spongy material constrains the PDC which is poured into it in a manner consistent with the critical dimensions required to preserve its integrity upon transformation into ceramic. The matrix of PDC voxels which conform to the required critical dimensional criteria may also be achieved by assembling spherical voxels directly from polymerized gray PDC.

Hybrid Objects

The bulk homogeneous pre-ceramic and ceramic material made from PDC will have an interstitial network of passages between interconnected voxels, where the gases dismissed during pyrolysis can escape without initiating structural failure.

Figure 4A:
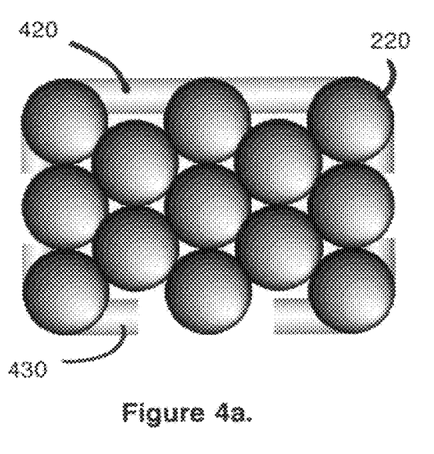
Figure 4B:
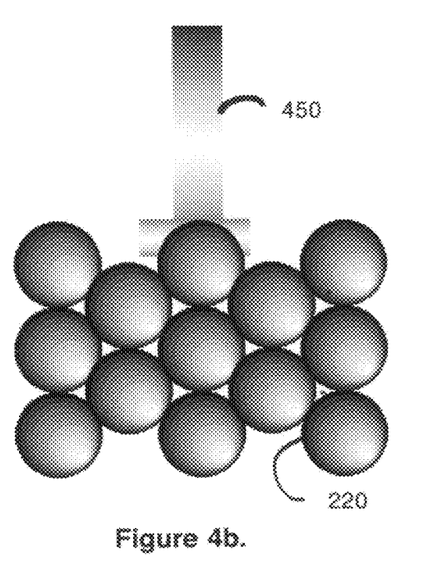
Figure 4C:
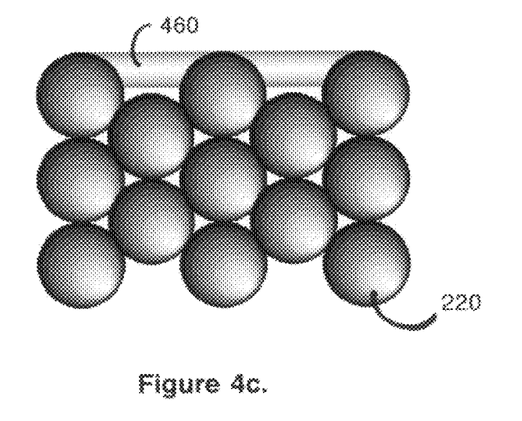

Consider a cube of material where one surface of the cube has a fully dense coating (460) of PDC upon it (FIG. 4c). The coating thickness does not exceed the critical thickness for the PDC, the outward facing surface can out-gas to the atmosphere directly and the coating's 'contact surface' can breath through its 'inward face' in touch with the interstitial network. Thus a 'hybrid' component can be formed which has contiguous volumes which are bulk pre-ceramic, and fully dense pre-ceramic. These hybrid pre-ceramic green bodies may then be formed to be unitary parts with both bulk ceramic and fully dense ceramic volumes. These bulk and fully dense regions co-exist on a pre-ceramic and then ceramic component (FIGS. 4a, 4b, 4c).

Consider two cubes of material where one surface of each cube may capture a fully dense film of PDC between it and the other. The film thickness does not exceed the critical thickness for the more sensitive PDC, the film can out-gas through the respective interstitial network in the cubes on either side of the constrained film (FIG. 3) (350). Thus a 'hybrid' component can be formed which has some volumes which are bulk pre-ceramic (301, 330), and some volumes that are fully dense pre-ceramic (310, 350, 340). These pre-ceramic volumes may then be formed to be both bulk ceramic and fully dense ceramic. These bulk and fully dense regions co-exist in a pre-ceramic and then ceramic component.

Consider a cube of material where one surface of the cube has a fully dense coating (420) of PDC upon it (FIG. 4a). The coating thickness does not exceed the critical thickness for the PDC, the outward facing surface can outgas to the atmosphere directly and the 'contact surface' can breath through the 'inner facing' interstitial network. Other surfaces (430) of the cube can also be coated with a fully dense film of PDC which does not exceed the critical thickness, as discussed. However, these other surfaces (430) which are coated must include sufficient 'openings' so as to allow the overall solid volume to breath and out-gas through the remaining interstitial channels (FIG. 4a). Thus a 'hybrid' component can be formed which has volumes which are bulk pre-ceramic, and fully dense pre-ceramic. These pre-ceramic parts may then be formed to be both bulk ceramic and fully dense ceramic. These bulk and fully dense regions co-exist on a pre-ceramic and then ceramic component.

A cube or other shape of material can be formed from one or more components of material made from 'bulk' PDC with 'fully dense films' formed where component parts share a surface at an adjoining location (FIG. 3, 350) and with complete 'fully dense films' on some outer surfaces (310, 340) and interrupted 'fully dense films' on other outer surfaces (FIG. 4a, 430) ... where the unitary pre-ceramic component may be transformed into a ceramic component.

(FIG. 5a) shows a front view of a bulk pre-ceramic frame (220) with a fully dense (510) window in it. (FIG. 5b) shows a right side cross section of the same hybrid assembly with the fully dense window (510), which has a thickness not exceeding the critical dimension for the PDC, supported in bulk material (220). The whole assembly will shrink at the same rate when transformed into ceramic, and the object will be preserved.

(FIG. 5c) shows a front view of a bulk pre-ceramic block (220) onto which a fully dense pre-ceramic feature is attached (530). (FIG. 5d) is a right side view of this assembly showing the line of attachment at the surface of the bulk part. The whole assembly will shrink at the same rate when transformed into ceramic, and the object will be preserved. This is similarly shown in FIG. 4b, with bulk material (220) connected to Fully dense material (450).

Figure 6A:
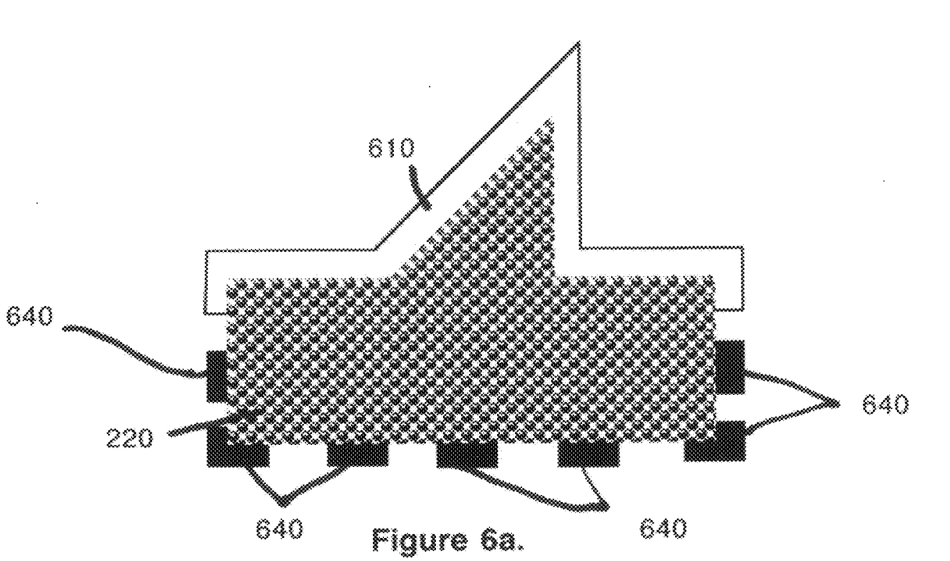

(FIG. 6a) shows a cross section of a bulk part (220) which has an uninterrupted coating (610) on a primary surface, which may be of the same PDC as used for the bulk part, and which has an interrupted coating (640) over other places in the part, where the PDC utilized may be a different PDC than was used for the bulk object. The whole assembly will shrink at substantially the same rate when transformed into ceramic, and the coating will be preserved when conforming to the constraints of critical dimensions, and the object will be preserved.

Figure 6B:
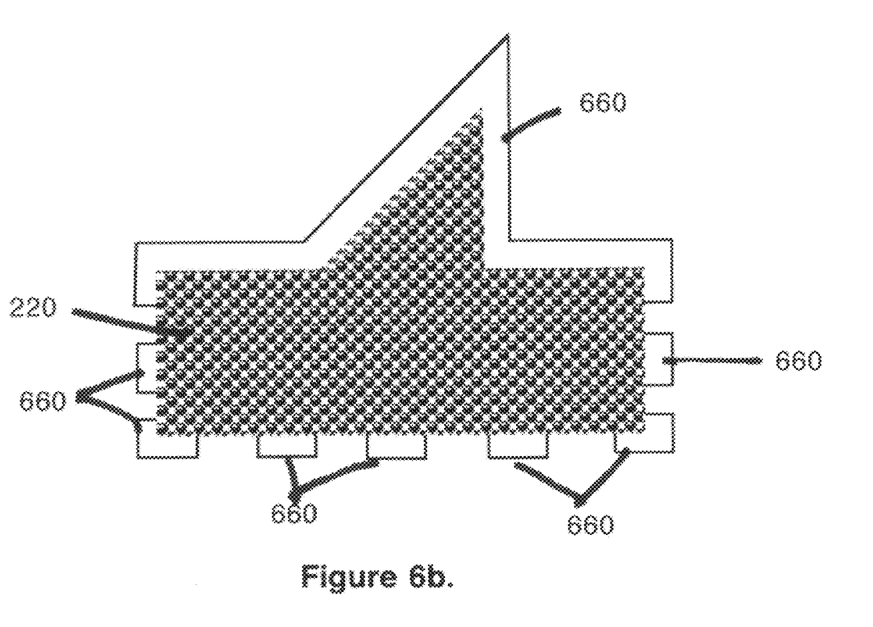

(FIG. 6b) shows a cross section of a bulk part (220) which has an uninterrupted coating (660) a primary surface, which may be of the same PDC as used for the bulk part, and which has an interrupted coating (660) over other places in the part, where the PDC utilized for coating is the same PDC than was used for the bulk object. The whole assembly will shrink at the same rate when transformed into ceramic, and the object will be preserved.

Composite Objects

As discussed previously, a cube or other shape can be formed from one or more volumes of material made from 'bulk' PDC with 'fully dense films' formed where component parts share a surface at an adjoining location and with complete 'fully dense films' on some outer surfaces and interrupted 'fully dense films' on other outer surfaces ... where the unitary pre-ceramic component may be transformed into a hybrid ceramic component.

Figure 5A:
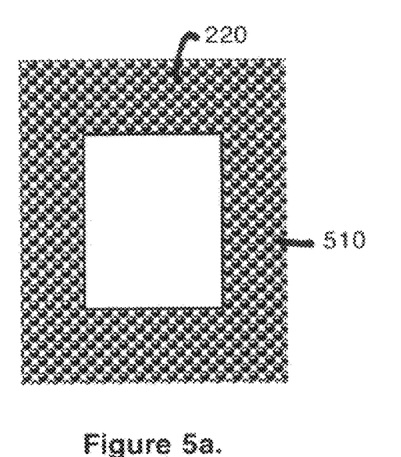
Figure 5B:
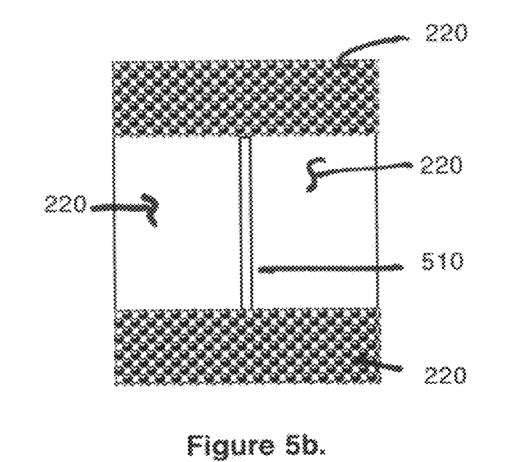

Introduced onto this shape can be an additional feature of PDC which does not exceed the critical thickness (FIGS. 5a,b). Such features can take the form of a wall, a rib, a fin or some other geometry which is attached to the bulk geometry or a coating on the bulk geometry, where the hybrid geometry has sufficient exposed interstitial passages to allow gas diffusion to occur without a catastrophic effect to the component as it is being transformed from PDC pre-ceramic to ceramic.

Such a feature can take the form of a wall which is attached to the bulk geometry like a window in a bulk ceramic frame (FIGS. 5a,b), where the hybrid geometry has sufficient exposed interstitial passages to allow gas diffusion to occur without a catastrophic effect to the component will it is being transformed from PDC pre-ceramic to ceramic.

Figure 5C:
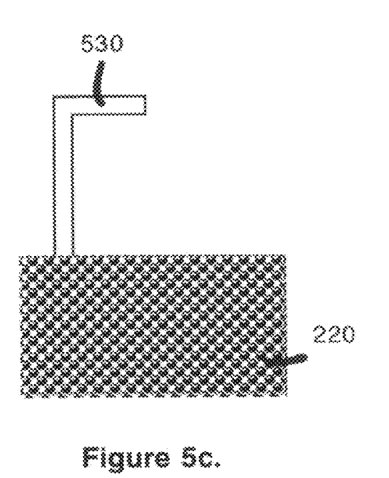
Figure 5D:
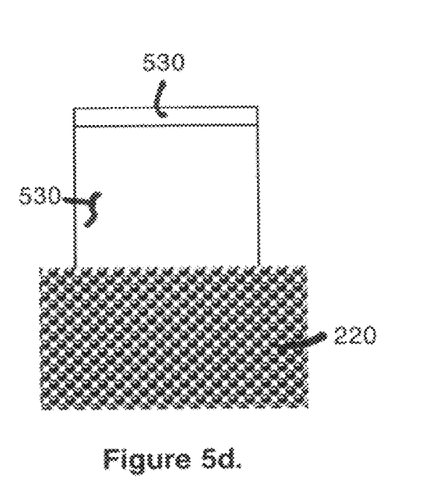

Such a feature can take the form of a wall which is attached to the bulk geometry like a rib connected at a coated surface (FIGS. 5 c,d), where the hybrid geometry has sufficient exposed interstitial passages to allow gas diffusion to occur without a catastrophic effect to the component will it is being transformed from PDC pre-ceramic to ceramic.

Such a feature can take the form of a wall which is attached to the bulk geometry like a fin connected at an uncoated surface (FIG. 4b), where the hybrid geometry has sufficient exposed interstitial passages to allow gas diffusion to occur without a catastrophic effect to the component while it is being transformed from PDC pre-ceramic to ceramic.

Figure 7A:
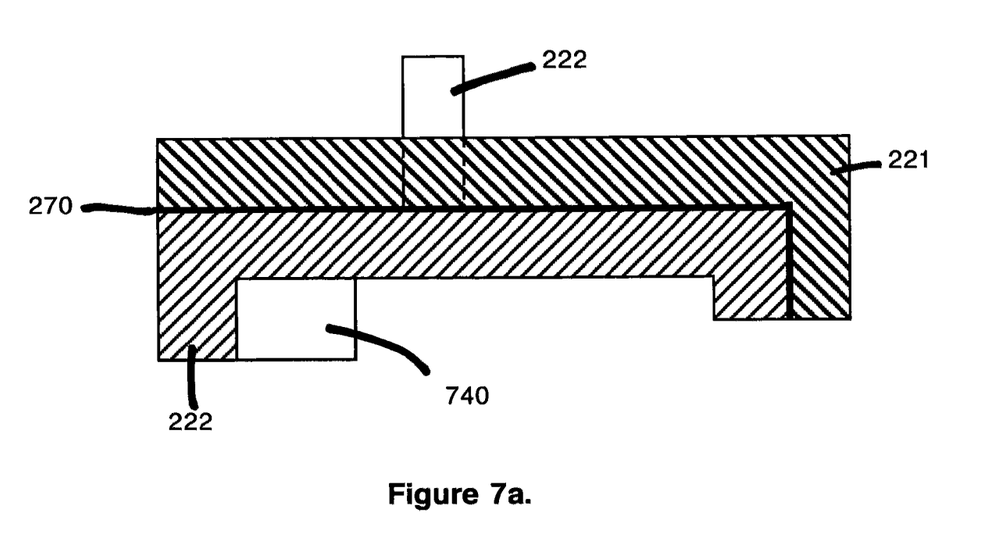

(FIGS. 7a and 7b) show hybrid objects with many complementary features. In FIG. 7a, item 222 is a bulk ceramic object with a pin which passes through a hole in object 221. There is an interface of PDC film which does not exceed the critical thickness, which occupies the adjoining surfaces at 222 and 221, and which transforms to ceramic at the same time as 222 and 221 pass to ceramic from pre-ceramic.

Figure 7B:
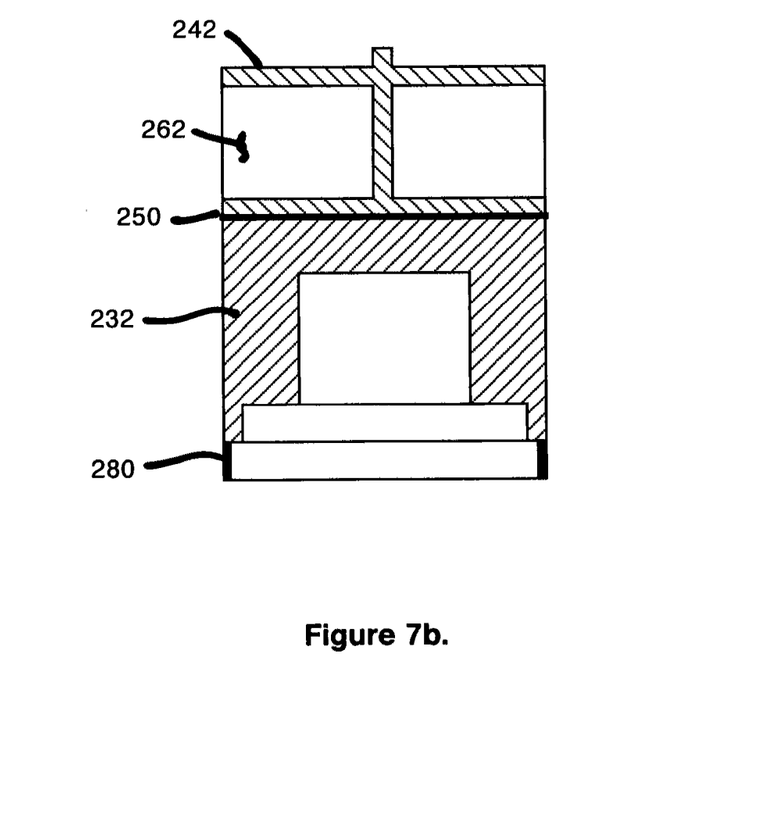

In FIG. 7b, a bulk ceramic item (242) shares an adjoining surface (250) with bulk ceramic object 232. Bulk ceramic object 232 has a fully dense ceramic wall that was formed at its base (280). Bulk ceramic object 242 has window like ribs (262) that were attached at three edges to the bulk ceramic frame formed by the upper bulk ceramic object (242).

Composite Hybrid

Consider multiple features and elements of bulk and fully dense pre-ceramic which are created from different scaffolds and PDCs. These may be assembled into unique structures which are wholly pre-ceramic and scaffold, or wholly ceramic. Several bulk and/or fully dense elements can be combined from pre-ceramic, ceramic and non-ceramic components.

Figure 8:
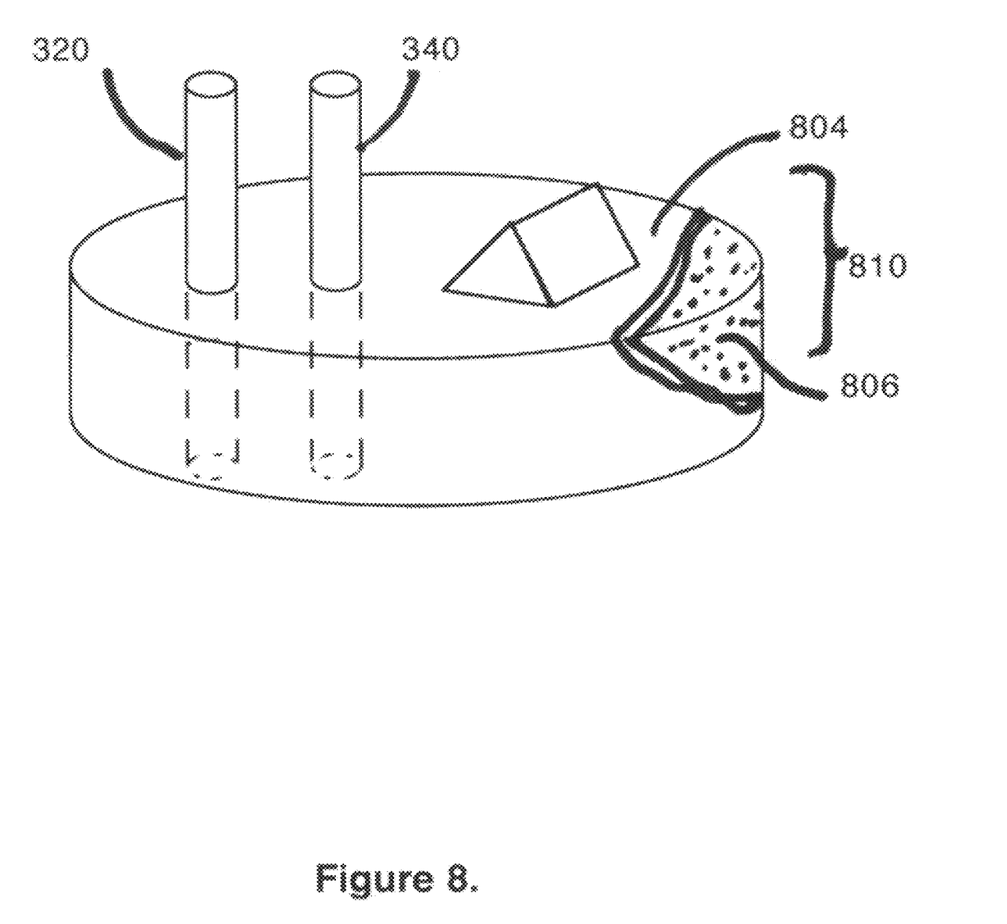
Figure 9:
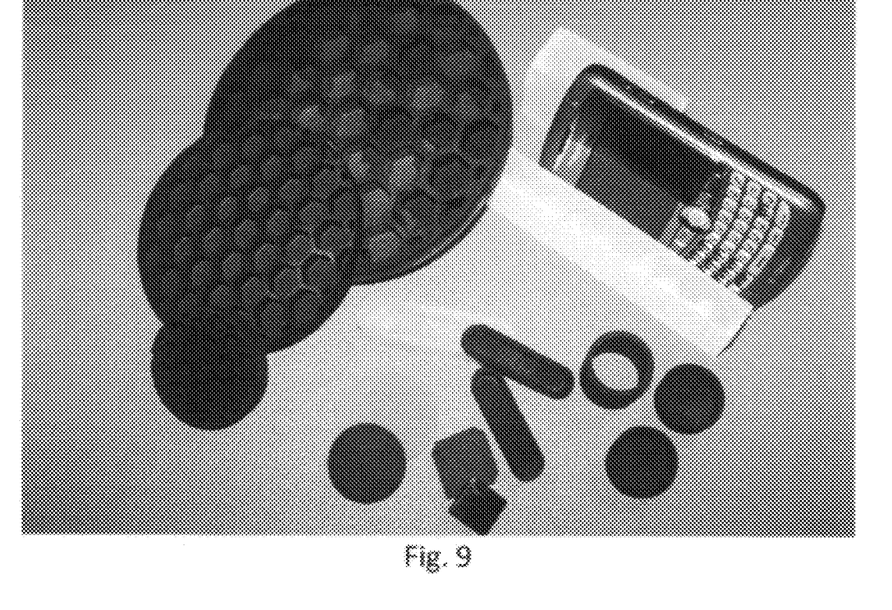
Figure 10:
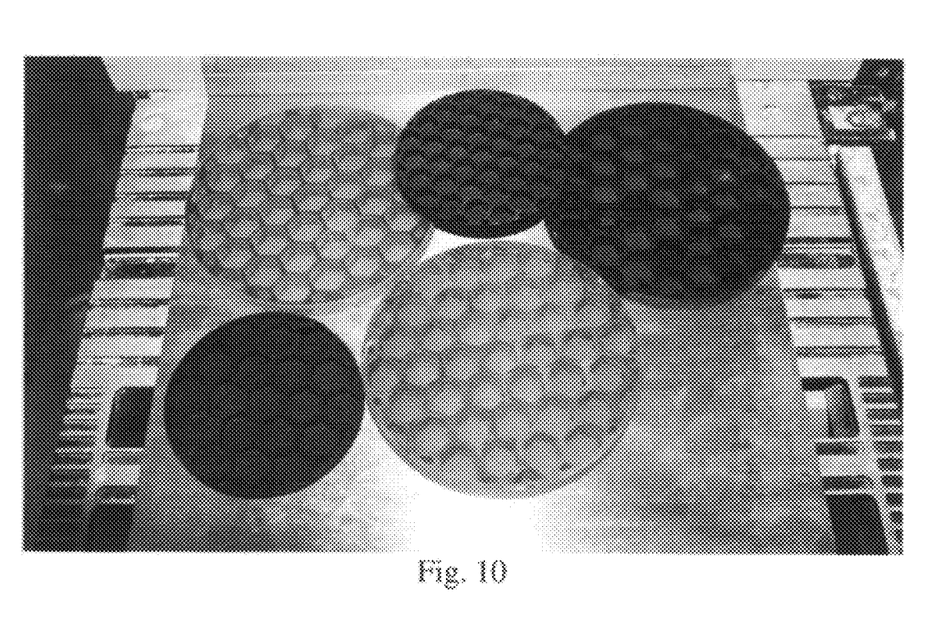
FIG. 10. Photograph of shaped green bodies and pyrolyzed ceramic parts.

In addition, objects can be introduced into the pre-ceramic object during its construction, which are pre-ceramic, ceramic or non-ceramic or combinations of these (FIG. 8). Consideration may be given for these constituent parts to adapt or conform to the overall structure as it transforms from pre-ceramic to ceramic. An example would be a twisted strand conductor of stainless steel with a polymeric insulating jacket (320 and 340). This 'wire' form may be supported in a PDC hybrid structure (810) to create a composite structure. When the pre-ceramic structure which contains the jacketed wire is exposed to the heat of pyrolysis, the polymeric jacket supporting the stranded conductors can burn or sublimate in much the same way as the spongy scaffold burns or sublimates in the bulk solid, preserving the interstitial network of breathing passages. The strands of stainless steel wire are constrained when the structure surrounding them shrinks onto them and supports them again.

There is a bulk material (806) which is coated on an outer face with fully dense material (804) forming an object (810), which traps jacketed wire (320) and jacketed wire (340).

Another example of a composite structure would be a glass disk mounted in a frame of pre-ceramic polymer, which is encased in ceramic during the pyrolysis process. The glass can deform elastically as the pre-ceramic material transforms into ceramic material.

We claim:

1. A method for synthesizing bulk, composite, and hybrid structures from polymer derived ceramic precursors comprising:
   providing at least one pre-ceramic white body for transformation into a first polymer derived ceramic;
   wherein a first pre-ceramic white body of the at least one pre-ceramic white body includes at least a first spongy material having cell pore paths arranged as a hexagonal close pack scaffold with at least a first polymer derived ceramic precursor saturating the cell pore paths of the first spongy material,
   wherein the cell pore paths of the first spongy material are critically dimensioned such that the critical diameter of the first spongy material cell pore paths is the diameter up to which a solid voxel of the first polymer derived ceramic precursor fits within the first spongy material cell pore path without the first polymer derived ceramic precursor solid voxel catastrophically failing or collapsing during pyrolysis;
   providing at least one pre-ceramic black body for transformation into a second polymer derived ceramic;
   wherein a first pre-ceramic black body of the at least one pre-ceramic black body includes at least a second spongy material having cell pore paths arranged as a hexagonal close pack scaffold with at least a second polymer derived ceramic precursor saturating the cell pore paths of the second spongy material,
   wherein the cell pore paths of the second spongy material are critically dimensioned such that the critical diameter of the second spongy material cell pore paths is the diameter up to which a solid voxel of the second polymer derived ceramic precursor fits within the second spongy material cell pore path without the second polymer derived ceramic precursor solid voxel catastrophically failing or collapsing during pyrolysis;
   joining the first pre-ceramic black body and the first pre-ceramic white body at an adjoining location to form a unified pre-ceramic structure;
   curing the unified pre-ceramic structure; and
   shaping the unified pre-ceramic structure.

2. The method of claim 1 further including pyrolyzing the unified pre-ceramic structure to transform the first and second polymer derived ceramic precursors respectively into first and second polymer derived ceramics.

3. The method of claim 1 wherein the first adjoining location is filled with a polymer derived ceramic precursor, the first adjoining location having a critical thickness not greater than the lesser of critical diameters of the first and second cell pore paths of the adjoined spongy materials.

4. The method of claim 1 further including:
   eliminating at least one of the first spongy material or the second spongy material, leaving in it's place an interstitially connected network of critically dimensioned channels formed by the critically dimensioned cell pore paths of the eliminated spongy material.

5. The method of claim 4 wherein the cured polymer derived ceramic precursor of the pre-ceramic body from which the spongy material was eliminated surrounds the network of critically dimensioned channels.

6. The method of claim 1 further including applying at least one layer of polymer derived ceramic precursor coating to an outermost portion of the unified pre-ceramic structure, the at least one layer of polymer derived ceramic precursor coating having a critical thickness not greater than the lesser of critical diameter of the cell pore paths of either of the spongy materials.

7. The method of claim 6 including applying at least one additional layer of polymer derived ceramic precursor coating to an outermost portion of the unified pre-ceramic structure, wherein the at least one additional layer includes non-continuous portions.

8. The method of claim 1 further including integrating at least one supplemental polymer derived ceramic precursor structure into the unified pre-ceramic structure,
   wherein the at least one supplemental polymer derived ceramic precursor structure has at least one critical dimension not greater than the lesser of critical diameters of the cell pore paths of the underlying spongy material.

9. The method of claim 6 further including attaching at least one supplemental polymer derived ceramic precursor structure to the at least one layer of polymer derived ceramic precursor coating,
   wherein the at least one supplemental polymer derived ceramic precursor structure has at least one critical dimension not greater than the critical thickness of the underlying pre-ceramic coating layer.

10. The method of claim 1 wherein a component is supported within the first or second spongy material, and
   wherein the first polymer derived ceramic precursor and the second polymer derived ceramic precursor are different from each other.

11. The method of claim 10 wherein the component is selected from a group consisting of polymer derived ceramics, ceramics, and non-ceramics or a combination thereof.

12. The method of claim 3, 5, 7, 8, or 11 further including pyrolyzing the unified pre-ceramic structure.

13. A method for synthesizing bulk, composite, and hybrid structures from polymer derived ceramic precursors comprising:
   providing at least one pre-ceramic gray body for transformation into a first polymer derived ceramic;
   wherein a first pre-ceramic gray body of the at least one pre-ceramic gray body includes at least a first spongy material having cell pore paths arranged as a hexagonal close pack scaffold with at least a first polymer derived ceramic precursor saturating the cell pore paths of the first spongy material,
   wherein the cell pore paths of the first spongy material are critically dimensioned such that the critical diameter of the first spongy material cell pore paths is the diameter up to which a solid voxel of the first polymer derived ceramic precursor fits within the first spongy material cell pore path without the first polymer derived ceramic precursor solid voxel catastrophically failing or collapsing during pyrolysis;
   curing the pre-ceramic gray body; and
   shaping the pre-ceramic gray body.

14. The method of claim 13 further including pyrolyzing the pre-ceramic gray body.

15. The method of claim 13 further including:
   eliminating the first spongy material and leaving in it's place an interstitially connected network of critically dimensioned channels formed by the critically dimensioned cell pore paths of the eliminated spongy material.

16. The method of claim 15 wherein cured polymer derived ceramic precursor of the pre-ceramic gray body from which the spongy material was eliminated surrounds the network of critically dimensioned channels.

17. The method of claim 13 wherein a component is supported within the first spongy material.

18. The method of claim 13 further including applying at least one layer of polymer derived ceramic precursor coating to an outermost portion of the pre-ceramic gray body, the at least one layer of polymer derived ceramic precursor coating having a critical thickness not greater than the critical diameter of the cell pore paths of the gray body spongy material.

19. The method of claim 18 including applying at least one additional layer of polymer derived ceramic precursor coating to an outermost portion of the pre-ceramic gray body, wherein the at least one additional layer includes non-continuous portions.

20. The method of claim 17 wherein the component is selected from a group consisting of polymer derived ceramics, ceramics, and non-ceramics or a combination thereof.

21. The method of claim 15, 16, 17, 18 or 19, further including pyrolyzing the pre-ceramic gray body.

22. The method of claim 1 wherein the first polymer derived ceramic precursor and the second polymer derived ceramic precursor are different from each other.

* * * * *